US011897475B2

(12) United States Patent
Park

(10) Patent No.: US 11,897,475 B2
(45) Date of Patent: Feb. 13, 2024

(54) APPARATUS AND METHOD FOR CONTROLLING TRANSMISSION OF VEHICLE

(71) Applicants: Hyundai Motor Company, Seoul (KR); Kia Motors Corporation, Seoul (KR)

(72) Inventor: Joon Shik Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 433 days.

(21) Appl. No.: 16/663,823

(22) Filed: Oct. 25, 2019

(65) Prior Publication Data

US 2020/0361473 A1 Nov. 19, 2020

(30) Foreign Application Priority Data

May 17, 2019 (KR) ........................ 10-2019-0057911

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/026* (2013.01);
(Continued)

(58) Field of Classification Search
CPC .... B60W 30/19; B60W 10/02; B60W 10/026; B60W 10/11; B60W 10/18;
(Continued)

(56) References Cited

U.S. PATENT DOCUMENTS 5,984,034 A * 11/1999 Morisawa ....... B60W 30/18127 903/945
6,119,799 A 9/2000 Morisawa et al.
(Continued)

FOREIGN PATENT DOCUMENTS

JP H09298802 A 11/1997
KR 1020130092089 * 1/2016 ............ B60W 30/19
KR 1018067080000 * 12/2017 ............ B60W 20/17

OTHER PUBLICATIONS

KR1018067080000 Machine Translation, Cho et al., Korea (Year: 2017).*
(Continued)

*Primary Examiner* — Jacob S. Scott
*Assistant Examiner* — Michael E Butler
(74) *Attorney, Agent, or Firm* — Fox Rothschild LLP

(57) ABSTRACT

An apparatus for controlling a transmission of a vehicle includes a determination device that determines whether a condition for a regenerative braking based lift foot up shift is satisfied, a controller that performs regenerative brake control and performs a shift by controlling release clutch torque and lock-up clutch torque, when the condition for the regenerative braking based lift foot up shift is satisfied, and a torque compensation device that compensates for the release clutch torque according to an RPM variation during the shift.

12 Claims, 6 Drawing Sheets

(51) Int. Cl.
*B60W 10/11* (2012.01)
*B60W 10/18* (2012.01)
*B60W 30/18* (2012.01)

(52) U.S. Cl.
CPC ............ *B60W 10/11* (2013.01); *B60W 10/18* (2013.01); *B60W 30/18127* (2013.01); *B60W 2510/1015* (2013.01); *B60W 2710/021* (2013.01); *B60W 2710/1005* (2013.01); *B60W 2710/18* (2013.01); *B60Y 2300/19* (2013.01)

(58) Field of Classification Search
CPC ... B60W 2510/1015; B60W 2710/021; B60W 2710/1005; B60W 2710/18; B60Y 2300/19
USPC ............................................................ 701/53
See application file for complete search history.

(56) References Cited

U.S. PATENT DOCUMENTS

| | | | | |
|---|---|---|---|---|
| 6,176,808 | B1 * | 1/2001 | Brown | B60K 6/48 903/910 |
| 2002/0023789 | A1 | 2/2002 | Morisawa et al. | |
| 2017/0166194 | A1 * | 6/2017 | Kumazaki | B60W 10/10 |
| 2018/0135744 | A1 * | 5/2018 | Kuang | B60W 50/0097 |

OTHER PUBLICATIONS

Notice of Allowance for Korean Application No. 10-2019-0057911 by the Korean Intellectual Property Office, dated Sep. 21, 2023, 4 pages, with English translation.

* cited by examiner

APPARATUS AND METHOD FOR CONTROLLING TRANSMISSION OF VEHICLE

CROSS-REFERENCE TO RELATED APPLICATION

This application claims under 35 U.S.C. § 119(a) the benefit of Korean Patent Application No. 10-2019-0057911, filed in the Korean Intellectual Property Office on May 17, 2019, the entire contents of which are incorporated herein by reference.

BACKGROUND

(a) Technical Field

The present disclosure relates to an apparatus and method for controlling a transmission of a vehicle.

(b) Description of the Related Art

An automatic transmission shifts into a target gear by interaction between a release clutch and a lock-up clutch, and shift performance of the automatic transmission depends substantially on operation and release timing of friction components. Accordingly, various shift control methods have been developed to enable flexible shifting of automatic transmissions.

A Lift Foot Up (LFU) shift control, which is one of the various shift control methods, refers to a manner of executing an upshift into a higher gear than the current gear in a situation (i.e., an accelerator position sensor (APS)-off state) in which a driver takes his or her foot off an accelerator pedal to reduce speed during travel of an automatic transmission vehicle.

The LFU shift control is completed by engaging a lock-up clutch after lowering the RPM by an inertial force in a state in which opposite clutch torques are released in a vicinity of an input torque of zero. Because the clutch torque is applied in the situation in which the input torque is very low, a sense of difference in gear shift is very small.

However, in a case of using a regenerative brake control apparatus, the LFU shift control may exhibit a sense of double deceleration and degrade driving performance because the LFU shift control ends the shift and performs regenerative braking in a gear shift situation when an entrance to a regenerative brake mode is made after the APS is turned off.

SUMMARY

An aspect of the present disclosure provides a transmission control apparatus and method of a vehicle that, when performing regenerative brake control during a Lift Foot Up (LFU) shift, adjusts release clutch torque according to an RPM variation, thereby eliminating a sense of double deceleration to improve driving performance, and improving fuel efficiency due to a performance of the regenerative brake control.

According to an aspect of the present disclosure, an apparatus for controlling a transmission of a vehicle includes a determination device that determines whether a condition for a regenerative braking based lift foot up shift is satisfied, a controller that performs regenerative brake control and performs a shift by controlling release clutch torque and lock-up clutch torque, when the condition for the regenerative braking based lift foot up shift is satisfied, and a torque compensation device that compensates for the release clutch torque according to an RPM variation during the shift.

The determination device may determine that the condition for the regenerative braking based lift foot up shift is satisfied, when a power-off upshift starts and a braking state by a brake pedal operation is identified before the shift starts in an accelerator position sensor (APS)-off state.

The determination device may determine that the condition for the regenerative braking based lift foot up shift is satisfied, when a power-off upshift starts and a braking state by a transition to a brake mode is identified before the shift starts in an APS-off state.

The controller may determine the release clutch torque by applying a compensation value to an input torque value.

The torque compensation device may compare a target RPM variation and an input RPM variation during the shift and may compensate for the release clutch torque to increase the release clutch torque by a first compensation value when the target RPM variation is greater than the input RPM variation.

The torque compensation device may compare a target RPM variation and an input RPM variation during the shift and may compensate for the release clutch torque to decrease the release clutch torque by a first compensation value when the target RPM variation is less than or equal to the input RPM variation.

The controller may perform torque intervention control according to the RPM variation in a hand-over interval after the shift is completed.

The controller may perform the torque intervention control when a value obtained by subtracting a target RPM from a transmission input RPM is less than zero during engagement of a clutch.

The torque compensation device may compensate for the lock-up clutch torque according to the RPM variation during engagement of a clutch.

The torque compensation device may compensate for the lock-up clutch torque to increase the lock-up clutch torque by a second compensation value, when a value obtained by subtracting a target RPM from a transmission input RPM is greater than or equal to zero during the engagement of the clutch.

According to another aspect of the present disclosure, a method for controlling a transmission of a vehicle includes determining whether a condition for a regenerative braking based lift foot up shift is satisfied, performing regenerative brake control, when the condition for the regenerative braking based lift foot up shift is satisfied, performing a shift by controlling release clutch torque and lock-up clutch torque, and compensating for the release clutch torque according to an RPM variation during the shift.

The determining may include determining that the condition for the regenerative braking based lift foot up shift is satisfied, when a power-off upshift starts and a braking state by a brake pedal operation is identified before the shift starts.

The determining may include determining that the condition for the regenerative braking based lift foot up shift is satisfied, when a power-off upshift starts and a braking state by a transition to a brake mode is identified before the shift starts.

The method may further include determining the release clutch torque by applying a compensation value to an input torque value when the shift starts.

The compensating of the release clutch torque may include comparing a target RPM variation and an input RPM variation during the shift and compensating for the release clutch torque to increase the release clutch torque by a first compensation value when the target RPM variation is greater than the input RPM variation.

The compensating of the release clutch torque may include comparing a target RPM variation and an input RPM variation during the shift and compensating for the release clutch torque to decrease the release clutch torque by a first compensation value when the target RPM variation is less than or equal to the input RPM variation.

The method may further include performing torque intervention control according to the RPM variation in a handover interval after the shift is completed.

The performing of the torque intervention control may be executed when a value obtained by subtracting a target RPM from a transmission input RPM is less than zero during engagement of a clutch.

The method may further include compensating for the lock-up clutch torque according to the RPM variation during engagement of a clutch.

The compensating of the lock-up clutch torque may include compensating for the lock-up clutch torque to increase the lock-up clutch torque by a second compensation value, when a value obtained by subtracting a target RPM from a transmission input RPM is greater than or equal to zero during the engagement of the clutch.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
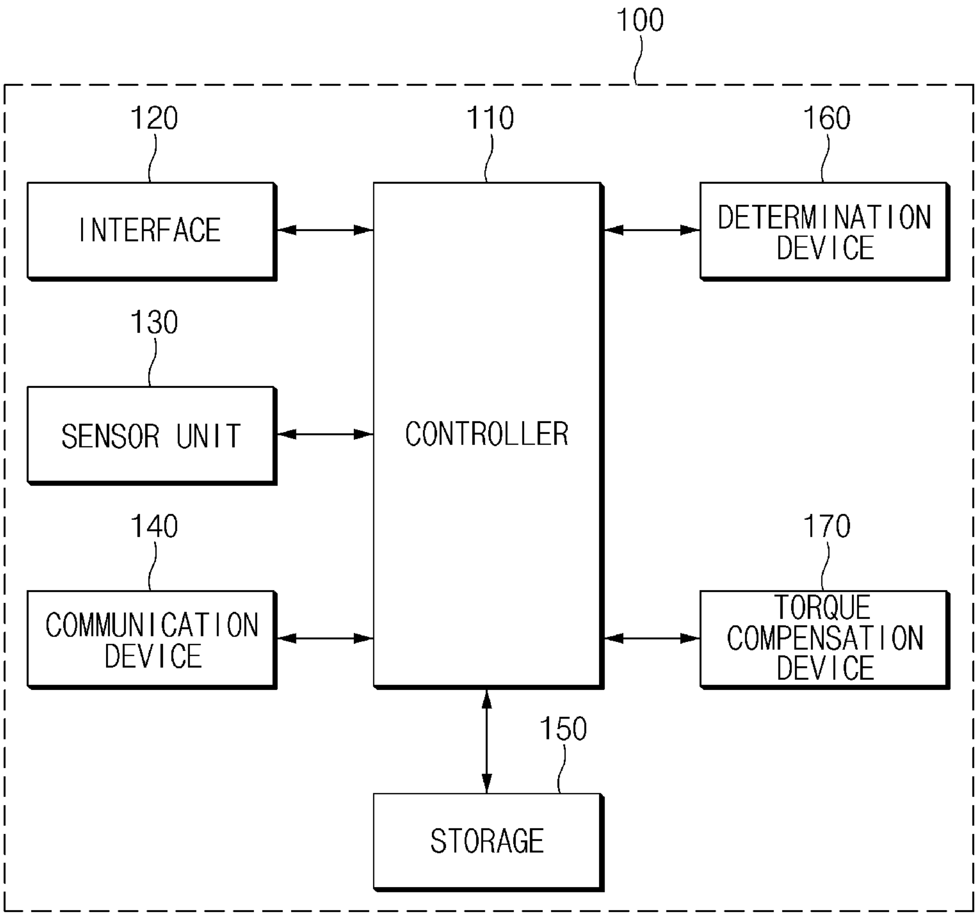
FIG. 1 is a block diagram illustrating a configuration of a transmission control apparatus of a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a transmission control apparatus of a vehicle according to the present disclosure.

The transmission control apparatus 100 according to the present disclosure is an apparatus applied to a vehicle including an automatic transmission such as an A/T, a DCT, or the like. The transmission control apparatus 100 may be implemented in the vehicle. The transmission control apparatus 100 may be integrated with control units in the vehicle, or may be implemented as a separate apparatus and may be connected with the control units of the vehicle by a separate connecting mechanism.

Referring to FIG. 1, the transmission control apparatus 100 according to the present disclosure may include a controller 110, an interface 120, a sensor unit 130, a communication device 140, storage 150, a determination device 160, and a torque compensation device 170. The controller 110, the determination device 160, and the torque compensation device 170 of the transmission control apparatus 100 according to this embodiment may be implemented as at least one processor.

The interface 120 may include an input device for receiving a control command from a user and an output device for outputting operational states and results of the transmission control apparatus 100.

The input device may include a key button and may also include a mouse, a joystick, a jog shuttle, a stylus pen, or the like. Further, the input device may include a soft key implemented on a display.

The output device may include a display and may also include a sound output device such as a speaker. When the display is equipped with a touch sensor such as a touch film, a touch sheet, a touch pad, or the like, the display may operate as a touch screen and may be implemented in the form in which an input device and an output device are integrated with each other.

The display may include at least one of a Liquid Crystal Display (LCD), a Thin Film Transistor-Liquid Crystal Display (TFF LCD), an Organic Light-Emitting Diode (OLED) display, a flexible display, a Field Emission Display (FED), and a three-dimensional (3D) display.

The sensor unit 130 may include a plurality of sensors that measure state information of the vehicle. For example, the state information of the vehicle may include at least one of APS, speed, acceleration, braking state, release/lock-up clutch torques, input torque, and input RPM.

The communication device 140 may include a communication module that supports communication interface with electronic units and/or control units in the vehicle. For example, the communication module may receive driving data (e.g., speed, acceleration, APS, and the like) of the vehicle from the control units in the vehicle. The communication module may include a module that supports vehicle network communication such as Controller Area Network (CAN) communication, Local Interconnect Network (LIN) communication, Flex-Ray communication, or the like.

The storage 150 may store data and/or algorithms required for the transmission control apparatus 100 to operate.

For example, the storage 150 may store condition information for performing regenerative brake control in a braking state at the start of a power-off upshift and condition information for compensating for release clutch torque at the start of an actual shift and performing torque intervention. Further, the storage 150 may store instructions and/or algorithms for performing lift foot up shift control based on regenerative braking. In addition, the storage 150 may store the state information of the vehicle received by the sensor unit 130 and/or the communication device 140.

The storage 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The determination device 160 determines whether a condition for performing lift foot up shift control based on regenerative braking is satisfied.

When a power-off upshift starts in an APS-off state and a braking state by a brake pedal operation or a transition to a brake mode is identified before a shift operation starts, the determination device 160 may determine that the condition for performing the lift foot up shift control based on regenerative braking is satisfied.

When the braking state by the brake pedal operation or the transition to the brake mode is not identified before an actual shift of the power-off upshift starts, the determination device 160 may determine that the condition for performing the lift foot up shift control based on regenerative braking is not satisfied.

The brake mode, which is an HEV brake mode, refers to a mode for performing control to enable travel of the vehicle by only an APS operation in frequent acceleration/deceleration situations by adjusting the amount of coasting-regenerative braking using a paddle. The brake mode is aimed at improving real road fuel economy and driver convenience by performing deceleration by only regenerative braking.

The determination device 160 may transfer the determination result of the condition for performing the lift foot up shift control to the controller 110 and/or the torque compensation device 170.

The controller 110 performs existing general lift foot up shift control when the determination device 160 determines that the condition for performing the lift foot up shift control is not satisfied, that is, when the braking state is not identified before the actual shift starts.

The general lift foot up shift control refers to the manner of executing an upshift into a gear that is higher than the current gear by one step and completing the shift by engaging a lock-up clutch after lowering the RPM by an inertial force in the state in which opposite clutch torques are released in the vicinity of an input torque of zero, when a driver takes the driver's foot off an accelerator pedal to reduce speed during travel of an automatic transmission vehicle.

The controller 110 may perform the general lift foot up shift control, based on Table 1 below that is a control table.

TABLE 1

| Part | Interval | Lock-up Clutch | Release Clutch | Power Change Shift | Return Shift | Intervention |
|---|---|---|---|---|---|---|
| Stick | 1 | Open | Hold | O | O | O |
| 2Slip | 2 | Stand by | Target | O | O | O |
| | 3 | ↑ | Rate | X | O | O |
| Pre Target | 4 | Rate | Rate & Target | X | O | O |
| Slip | 5 | Stand by | Stand by | X | X | O |
| | 6 | ↑ | ↑ | X | X | O |
| | — | — | — | — | — | — |
| HandOver | 8 | Rate & Target | Open | X | X | X |
| Slip2 Stick | 9 | Rate &Target | Open | X | X | X |

Meanwhile, the controller 110 performs the lift foot up shift control based on regenerative braking when the determination device 160 determines that the condition for performing the lift foot up shift control is satisfied, that is, when the braking state by the brake pedal operation or the transition to the brake mode is identified before the actual shift starts.

The controller 110 may perform the regenerative braking based lift foot up shift control, based on Table 2 below that is a control table.

TABLE 2

| Part | Interval | Lock-up Clutch | Release Clutch | Power Change Shift | Return Shift | Intervention |
|---|---|---|---|---|---|---|
| Stick | 1 | Open | Hold | X | O | X |
| 2Slip | 2 | Stand by | Target | X | O | X |
| | 3 | ↑ | Rate | X | O | X |
| Pre | 4 | Rate | ↑ | X | O | X |
| Target Slip | 5 | Stand by | Target (F/B) | X | O | X |
| | 6 | ↑ | Stand by (F/B) | X | O | X |
| | 7 | ↑ | Rate | X | O | X |
| HandOver | 8 | Rate & Target | Rate & Target | X | X | O |
| Slip2 Stick | 9 | Rate & Target | Rate & Target | X | X | X |

When performing the regenerative braking based lift foot up shift control, the controller 110 may perform regenerative brake control before starting the actual shift.

The controller 110 applies release clutch torque to a transmission when the actual shift starts in the regenerative brake control state. In this case, the controller 110 may determine the release clutch torque by applying a compensation value considering actual shift progress to input torque.

Further, the controller 110 may request compensation for the release clutch torque from the torque compensation device 170 through feedback control for an RPM variation during the actual shift. Accordingly, the torque compensation device 170 may compensate for the release clutch torque according to the RPM variation during the actual shift and may apply the compensated release clutch torque to the controller 110.

The torque compensation device 170 may compare a target RPM variation and an input RPM variation during the actual shift and may compensate for the release clutch torque to increase the release clutch torque by a first compensation value α when the target RPM variation is greater than the input RPM variation.

Meanwhile, the torque compensation device 170 may compare the target RPM variation and the input RPM variation during the actual shift and may compensate for the release clutch torque to decrease the release clutch torque by the first compensation value α when the target RPM variation is less than or equal to the input RPM variation.

Accordingly, the controller 110 may perform the shift control by applying the release clutch torque compensated for by the torque compensation device 170 to the transmission.

At the end of the shift, the controller 110 performs torque intervention control according to the RPM variation in a hand-over interval in which the release clutch torque and the lock-up clutch torque are applied before a clutch is completely engaged after the actual shift is completed.

The controller 110 performs the torque intervention when a transmission input RPM minus a target RPM is less than zero during the engagement of the clutch.

Meanwhile, the controller 110 may request compensation for the lock-up clutch torque from the torque compensation device 170 when the transmission input RPM minus the target RPM is greater than or equal to zero during the engagement of the clutch.

Accordingly, the torque compensation device 170 may compensate for the lock-up clutch torque to increase the lock-up clutch torque by a preset second compensation value β when the transmission input RPM minus the target RPM is greater than or equal to zero during the engagement of the clutch.

Thus, the controller 110 may perform the shift control by applying the lock-up clutch torque compensated for by the torque compensation device 170 to the transmission during the engagement of the clutch.

As described above, the transmission control apparatus 100 of the vehicle according to the present disclosure may generate the undershoot for each shift by base control, thereby ensuring robustness and may complete the engagement slip using the intervention in the situation of fixing the clutch torque, thereby maintaining the same shift quality even in the case of the regenerative brake control during the shift.

The transmission control apparatus 100 according to this embodiment, which operates as described above, may be implemented in the form of an independent hardware device that includes a memory and a processor that processes each operation, and may be operated in the form included in another hardware device such as a microprocessor or a generic-purpose computer system.

Figure 2:
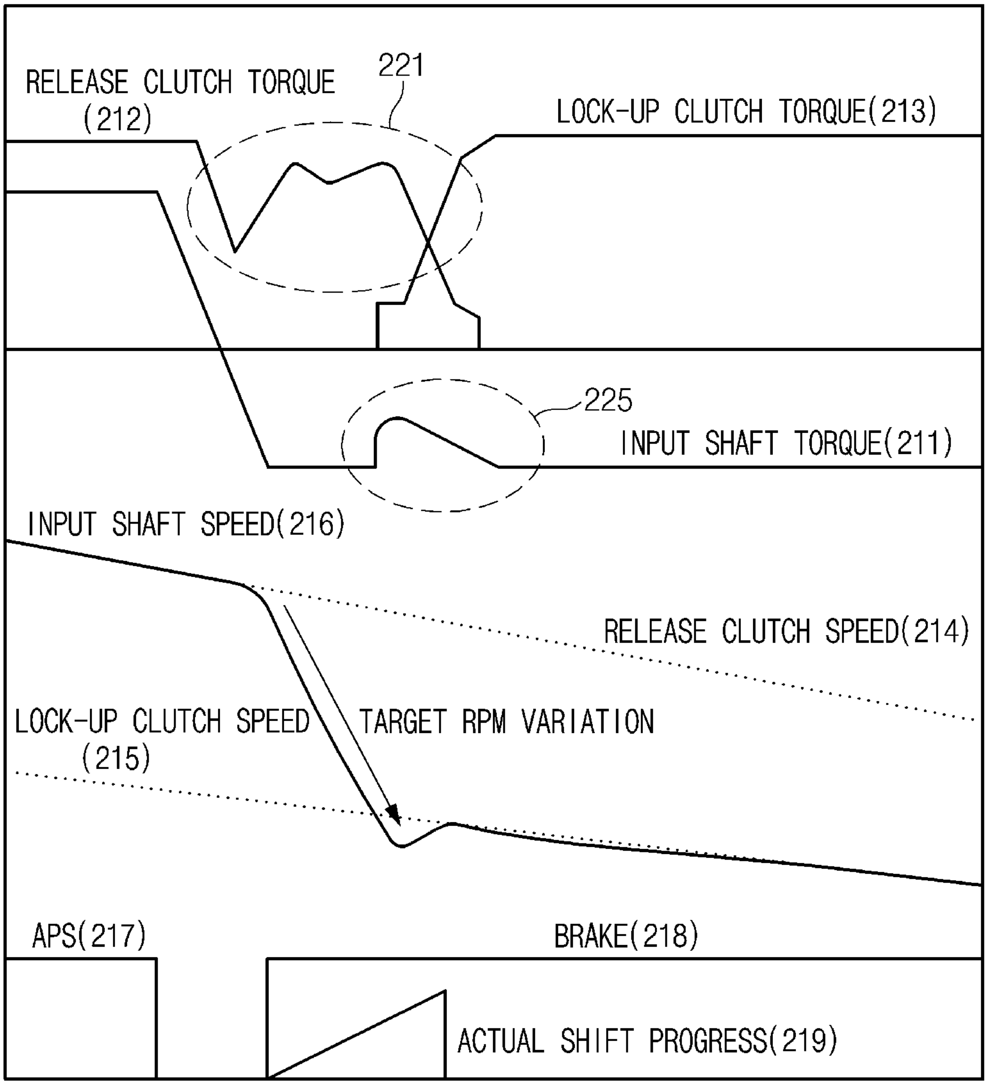
FIG. 2 is a block diagram illustrating an embodiment that is referred to in describing an operation of the transmission control apparatus of the vehicle according to an embodiment of the present disclosure.

FIG. 2 is a block diagram illustrating an embodiment that is referred to in describing an operation of the transmission control apparatus of the vehicle according to an embodiment of the present disclosure, where FIG. 2 is a graph depicting state changes of control components according to a lift foot up shift control operation based on regenerative braking.

Referring to FIG. 2, reference numeral 211 denotes input shaft torque, reference numeral 212 denotes release clutch torque, reference numeral 213 denotes lock-up clutch torque, reference numeral 214 denotes release clutch speed, reference numeral 215 denotes lock-up clutch speed, reference numeral 216 denotes input shaft speed, reference numeral 217 denotes an accelerator position sensor (APS), reference numeral 218 denotes a brake or brake mode state, and reference numeral 219 denotes actual shift progress.

The transmission control apparatus 100 may increase/decrease the release clutch torque through feedback control according to an RPM variation as represented by reference numeral 221 during a lift foot up shift in an APS-off state, thereby suppressing a sharp decrease in RPM due to an increase in regenerative braking. In this case, the transmission control apparatus 100 may increase the amount of regenerative braking irrespective of the shift, thereby achieving an improvement in fuel economy.

Reference numeral 225 denotes an intervention interval. The transmission control apparatus 100 may perform torque intervention according to the RPM variation to eliminate a sense of difference in gear shift during engagement of the clutch at the end of the shift. In this case, due to the torque intervention, the transmission control apparatus 100 may eliminate the sense of difference in gear shift, thereby achieving an improvement in driving performance.

Operations of the above-configured transmission control apparatus according to the present disclosure will be described below in more detail.

Figure 3:
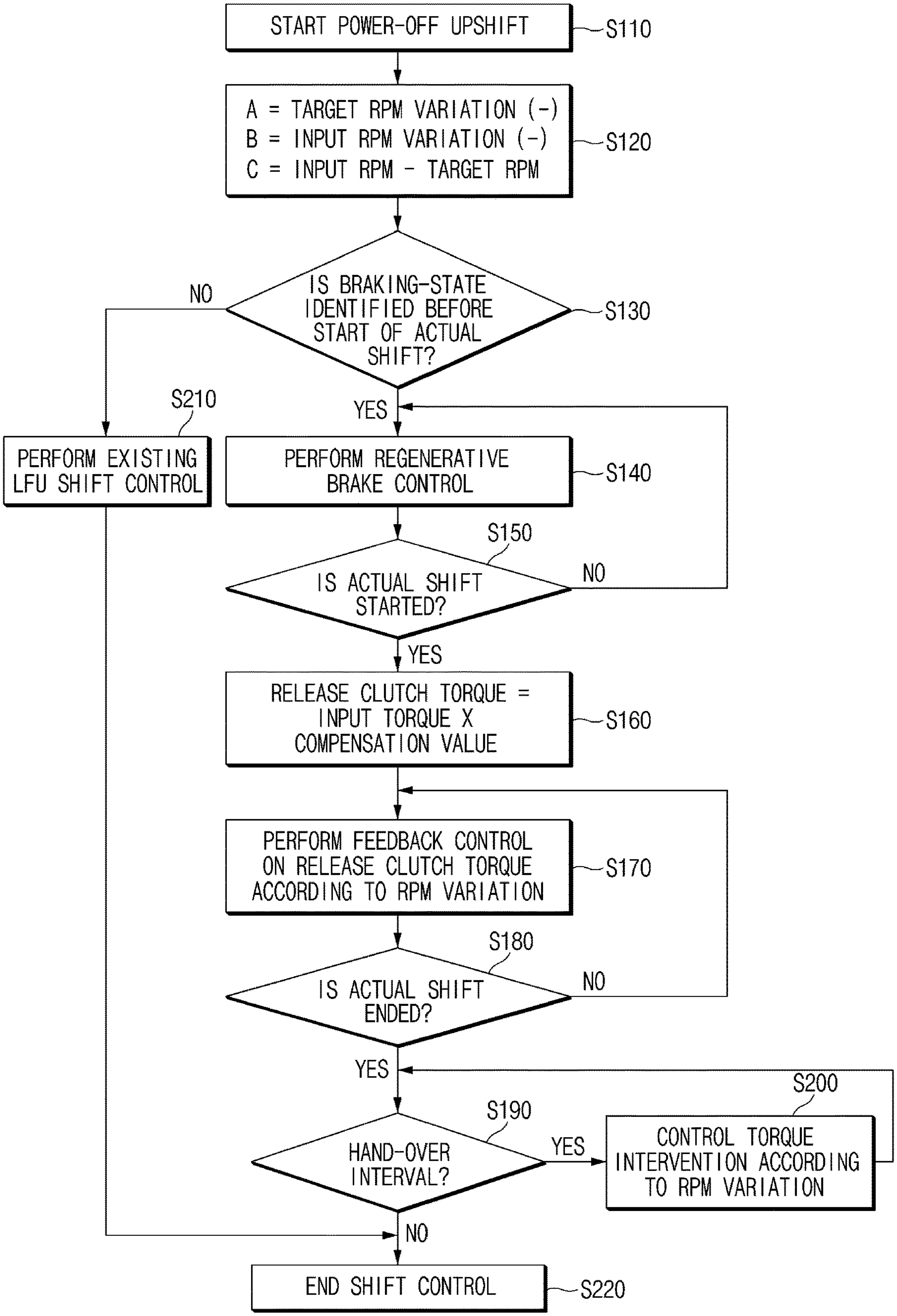
FIGS. 3, 4, and 5 are flowcharts illustrating a transmission control method of a vehicle according to an embodiment of the present disclosure.
Figure 4:
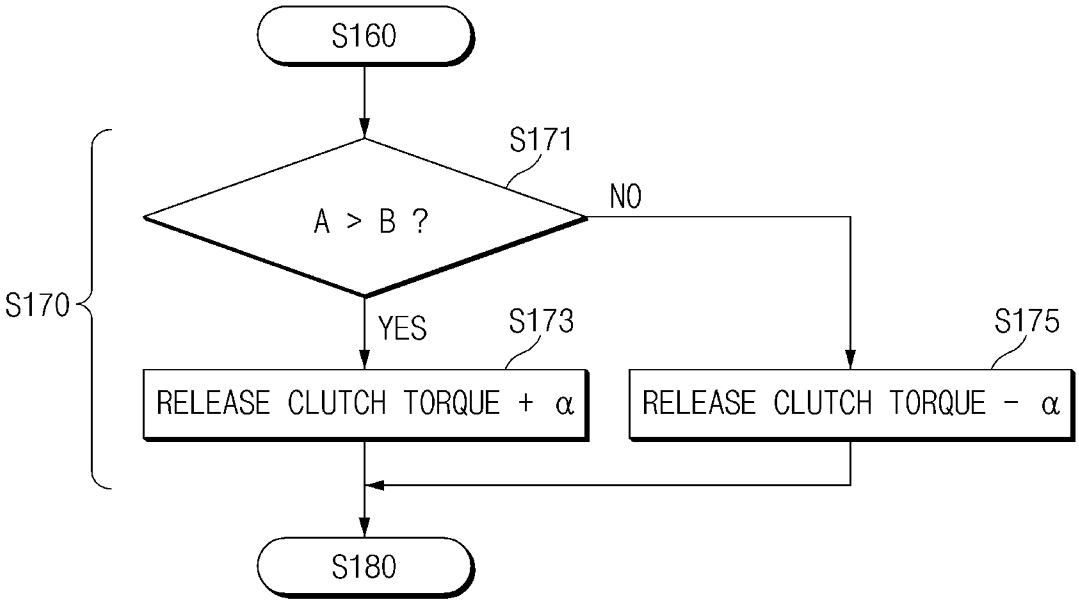
Figure 5:
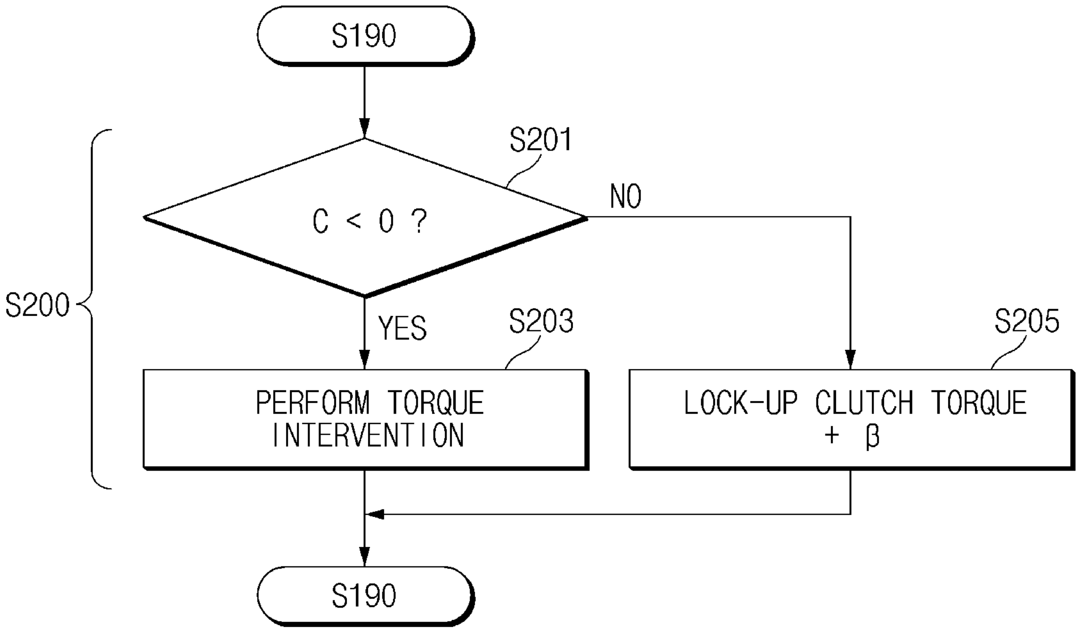

FIGS. 3, 4, and 5 are flowcharts illustrating a transmission control method of a vehicle according to an embodiment of the present disclosure.

Referring to FIG. 3, when a power-off upshift starts (S110), the transmission control apparatus 100 determines whether a braking state is identified in a shift preparation interval before the start of an actual shift (S130). In step S130, the transmission control apparatus 100 may identify the braking state, based on whether a brake pedal is operated. Further, the transmission control apparatus 100 may identify the braking state, based on whether a transition to a brake mode is made.

When the braking state is not identified in the shift preparation interval before the start of the actual shift, the transmission control apparatus 100 performs existing lift foot up shift control (S220).

The existing lift foot up shift control refers to the manner of releasing release clutch torque and dropping input shaft RPM to a very small torque value, for example, −Tq during braking after an actual shift and completing the shift by applying lock-up clutch torque when the input shaft RPM reaches a rear gear target speed.

Meanwhile, when the braking state is identified in the shift preparation interval before the start of the actual shift, the transmission control apparatus 100 performs lift foot up shift control based on regenerative braking (S140).

The lift foot up shift control based on regenerative braking refers to the manner of performing regenerative brake control without controlling torque in an actual shift interval and suppressing downward divergence of input shaft torque by adjusting release clutch torque according to an RPM variation.

The transmission control apparatus 100 performs the regenerative brake control before starting the actual shift (S140) and determines the release clutch torque by applying a compensation value to an input torque value when the actual shift starts (S150). Thereafter, the transmission control apparatus 100 performs feedback control on the release clutch torque according to the RPM variation until the actual shift ends (S170).

The operation of adjusting the release clutch torque through the feedback control will be described in detail with reference to the flowchart of FIG. 4.

Referring to FIG. 4, the transmission control apparatus 100 compares a first value “A” and a second value “B” after the release clutch torque is set in step S160. The first value “A” refers to a target RPM variation (-), and the second value “B” refers to an input RPM variation (-). The first value “A” and the second value “B” may be defined in step S120 before the start of the actual shift. Of course, the first value “A” and the second value “B” may also be defined before the start of the power-off upshift.

When the first value “A” is greater than the second value “B” (S171), the transmission control apparatus 100 compensates for the release clutch torque to increase the release clutch torque by a first compensation value α (S173). Meanwhile, when the first value “A” is less than or equal to the second value “B” (S171), the transmission control apparatus 100 compensates for the release clutch torque to decrease the release clutch torque by the first compensation value α (S175).

In this case, the transmission control apparatus 100 may suppress a sharp decrease in input RPM due to an increase in regenerative braking, by increasing the release clutch torque.

As described above, the transmission control apparatus 100 adjusts the increase/decrease of the release clutch torque by performing the feedback compensation control in steps S171, S173, and S175 during the actual shift.

Thereafter, when the actual shift ends (S180), the transmission control apparatus 100 determines whether the shift interval corresponds to a hand-over interval before complete engagement of a clutch at the end of the shift (S190).

When control focused on lock-up clutch torque is performed in the hand-over interval, a sense of difference occurs during the engagement of the clutch, differently from the power-off shift strategy.

Therefore, to minimize the sense of difference during the engagement of the clutch and satisfy the shift quality in the existing LFU shift, the transmission control apparatus 100 performs torque intervention control according to the RPM variation (S200).

The operation of performing the torque intervention control according to the RPM variation will be described in detail with reference to the flowchart of FIG. 5.

Referring to FIG. 5, the transmission control apparatus 100 compares a transmission input RPM and a target RPM when it is identified in step S190 after the completion of the actual shift that the shift interval corresponds to the hand-over interval. When a third value “C” obtained by subtracting the target RPM from the transmission input RPM is less than zero (S201), the transmission control apparatus 100 performs torque intervention (S203). Meanwhile, when the third value “C” is not less than zero (S201), the transmission control apparatus 100 compensates for the lock-up clutch to increase the lock-up clutch torque by a second compensation value β (S205).

The transmission control apparatus 100 may perform step S200 until the clutch is completely engaged. As described above, a sense of difference is likely to occur according to a correlation between the input torque and the lock-up clutch torque during the engagement of the clutch in the situation in which the input torque is applied, and therefore the transmission control apparatus 100 may synchronize the input torque and the lock-up clutch torque through the torque intervention, thereby preventing the sense of difference.

When the clutch is completely engaged, the transmission control apparatus 100 ends the shift control operation (S210).

Figure 6:
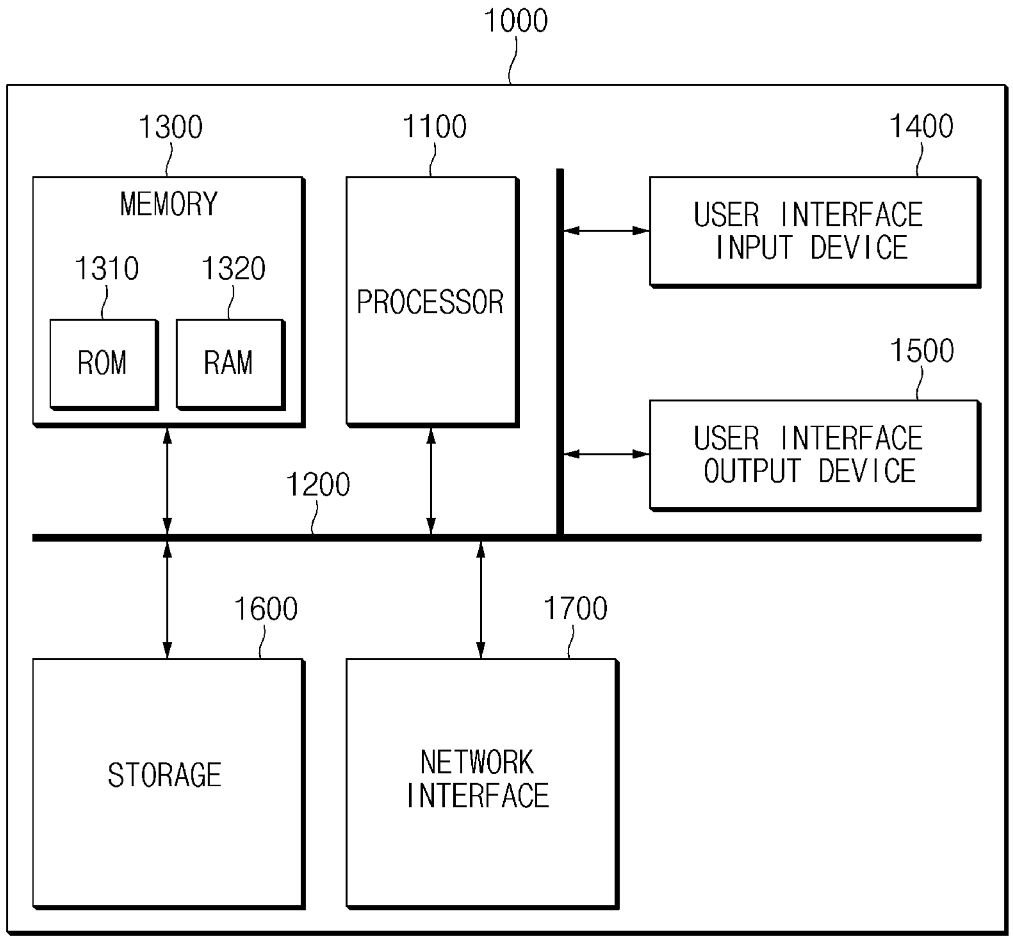
FIG. 6 is a block diagram illustrating a computing system for executing a method according to an embodiment of the present disclosure.

FIG. 6 is a block diagram illustrating a computing system for executing a method according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

According to the present disclosure, the transmission control apparatus and method, when performing the regenerative brake control during the Lift Foot Up (LFU) shift, adjusts the release clutch torque according to the RPM variation, thereby eliminating a sense of double deceleration to improve driving performance, and improving fuel efficiency due to the performance of the regenerative brake control.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a transmission of a vehicle, the apparatus comprising:
- a determination device configured to determine whether a condition for a regenerative braking based lift foot up shift is satisfied;
- a controller configured to perform regenerative brake control and perform a shift by controlling release clutch torque and lock-up clutch torque, when the condition for the regenerative braking based lift foot up shift is satisfied; and
- a torque compensation device configured to compensate for the release clutch torque according to an RPM variation during the shift;
- wherein the torque compensation device is configured to:
  - compare a target RPM variation and an input RPM variation during the shift;
  - compensate for the release clutch torque to increase the release clutch torque by a first compensation value when the target RPM variation is greater than the input RPM variation; and
  - compensate for the release clutch torque to decrease the release clutch torque by a first compensation value when the target RPM variation is less than or equal to the input RPM variation wherein the controller is configured to determine the release clutch torque by applying a compensation value to an input torque value.

2. The apparatus of claim 1, wherein the determination device is configured to determine that the condition for the regenerative braking based lift foot up shift is satisfied when a power-off upshift starts and a braking state by a transition to a brake mode is identified before the shift starts in an accelerator position sensor (APS)-off state.

3. The apparatus of claim 1, wherein the controller is configured to perform torque intervention control according to the RPM variation in a hand-over interval after the shift is completed.

4. The apparatus of claim 3, wherein the controller is configured to perform the torque intervention control when a value obtained by subtracting a target RPM from a transmission input RPM is less than zero during engagement of a clutch.

5. The apparatus of claim 1, wherein the torque compensation device is configured to compensate for the lock-up clutch torque according to the RPM variation during engagement of a clutch.

6. The apparatus of claim 5, wherein the torque compensation device is configured to compensate for the lock-up clutch torque to increase the lock-up clutch torque by a second compensation value when a value obtained by subtracting a target RPM from a transmission input RPM is greater than or equal to zero during the engagement of the clutch.

7. A method for controlling a transmission of a vehicle, the method comprising:
- determining, by a determination device, whether a condition for a regenerative braking based lift foot up shift is satisfied;
- performing regenerative brake control, by a controller, when the condition for the regenerative braking based lift foot up shift is satisfied;
- performing a shift, by the controller, by controlling release clutch torque and lock-up clutch torque; and
- compensating for the release clutch torque, by a torque compensation device, according to an RPM variation during the shift;
- wherein the compensating of the release clutch torque includes:
  - comparing a target RPM variation and an input RPM variation during the shift;
  - compensating for the release clutch torque to increase the release clutch torque by a first compensation value when the target RPM variation is greater than the input RPM variation; and
  - compensating for the release clutch torque to decrease the release clutch torque by a first compensation value when the target RPM variation is less than or equal to the input RPM variation wherein the controller is configured to determine the release clutch torque by applying a compensation value to an input torque value.

8. The method of claim 7, wherein the determining includes:
- determining that the condition for the regenerative braking based lift foot up shift is satisfied, when a power-off upshift starts and a braking state by a transition to a brake mode is identified before the shift starts.

9. The method of claim 7, further comprising:
- performing torque intervention control according to the RPM variation in a hand-over interval after the shift is completed.

10. The method of claim 9, wherein the performing of the torque intervention control is executed when a value obtained by subtracting a target RPM from a transmission input RPM is less than zero during engagement of a clutch.

11. The method of claim 7, further comprising:

compensating for the lock-up clutch torque according to the RPM variation during engagement of a clutch.

12. The method of claim 11, wherein the compensating of the lock-up clutch torque includes:

compensating for the lock-up clutch torque to increase the lock-up clutch torque by a second compensation value, when a value obtained by subtracting a target RPM from a transmission input RPM is greater than or equal to zero during the engagement of the clutch.

* * * * *